United States Patent
Wang et al.

(10) Patent No.: US 9,475,538 B2
(45) Date of Patent: Oct. 25, 2016

(54) FOLDABLE RIDING VEHICLE

(71) Applicant: LEKUMA ENERGY TECHNOLOGY INC., Taichung (TW)

(72) Inventors: Yao-Chin Wang, Taichung (TW); Shuo-Feng Wang, Taichung (TW)

(73) Assignee: Lekuma Energy Technology Inc., Taichung (TW)

( * ) Notice: Subject to any disclaimer, the term of this patent is extended or adjusted under 35 U.S.C. 154(b) by 0 days.

(21) Appl. No.: 14/832,059

(22) Filed: Aug. 21, 2015

(65) Prior Publication Data

US 2016/0144925 A1 May 26, 2016

(30) Foreign Application Priority Data

Nov. 25, 2014 (TW) .............................. 103140824 A

(51) Int. Cl.
| | | |
|---|---|---|
| *B62K 15/00* | (2006.01) | |
| *B62K 21/16* | (2006.01) | |
| *B62K 21/20* | (2006.01) | |
| *B62K 25/00* | (2006.01) | |

(52) U.S. Cl.
CPC ............. *B62K 15/008* (2013.01); *B62K 21/16* (2013.01); *B62K 21/20* (2013.01); *B62K 25/005* (2013.01); *B62K 2015/003* (2013.01); *B62K 2015/005* (2013.01)

(58) Field of Classification Search
CPC .............. B62K 15/008; B62K 15/006; B62K 2015/003; B62K 2015/005
USPC ....................................................... 280/261
See application file for complete search history.

(56) References Cited

U.S. PATENT DOCUMENTS

| | | | | |
|---|---|---|---|---|
| 4,111,447 A | * | 9/1978 | Ishida ................... | B62K 15/008 280/261 |
| 4,202,561 A | * | 5/1980 | Yonkers ............... | B62K 15/008 280/278 |
| 4,634,138 A | * | 1/1987 | Fryer ................... | B62K 15/008 280/278 |
| 6,196,566 B1 | * | 3/2001 | Zhang .................. | B62K 15/008 280/278 |
| 6,267,401 B1 | * | 7/2001 | De Jong .............. | B62K 15/008 280/287 |
| 6,364,335 B1 | * | 4/2002 | Mombelli ............ | B62K 15/008 280/278 |

(Continued)

FOREIGN PATENT DOCUMENTS

| | | |
|---|---|---|
| TW | I373429 B | 10/2012 |
| TW | M481870 U | 7/2014 |

*Primary Examiner* — Joseph Rocca
*Assistant Examiner* — Michael Stabley
(74) *Attorney, Agent, or Firm* — Alan D. Kamrath; Kamrath IP Lawfirm, P.A.

(57) ABSTRACT

A foldable riding vehicle includes a frame having a front end and a rear end pivotally connected together. The front end is connected to a steering mechanism which includes a steering handle and which engages with a front wheel. The rear end has a first distal end pivotally connected to the front end and a second distal end engaging with a rear wheel. A seat support has a first end pivotally connected to the rear end of the frame and a second end supporting a seat. A pedal mechanism is movable between use and stowed positions. The foldable riding vehicle, in a folded position, includes the steering handle located symmetrically with respect to the frame and the pedal mechanism moving to the stowed position, and allows the front wheel to be located above the rear wheel and not to abut a surface, and the rear wheel to rotate on the surface.

16 Claims, 7 Drawing Sheets

(56) References Cited

U.S. PATENT DOCUMENTS

| | | | | |
|---|---|---|---|---|
| 6,688,625 B1* | 2/2004 | Schreuder | B62K 15/008 | 280/260 |
| 6,799,771 B2* | 10/2004 | Bigot | B62K 15/008 | 280/278 |
| 6,979,013 B2* | 12/2005 | Chen | B62K 15/008 | 280/278 |
| 7,341,268 B2* | 3/2008 | Lin | B62K 15/008 | 280/278 |
| 8,162,345 B1* | 4/2012 | Szu-Yao | B62K 15/008 | 280/278 |
| 8,308,178 B2* | 11/2012 | Hoerdum | B62K 15/008 | 180/208 |
| 2008/0164675 A1* | 7/2008 | Ma | B62K 15/008 | 280/287 |
| 2010/0066054 A1* | 3/2010 | Chen | B62K 15/008 | 280/278 |
| 2011/0193313 A1* | 8/2011 | Yun | B62K 15/008 | 280/278 |
| 2014/0225348 A1* | 8/2014 | Wu | B62K 15/008 | 280/278 |
| 2014/0327226 A1* | 11/2014 | Gerencser | B62K 15/008 | 280/278 |
| 2014/0333044 A1* | 11/2014 | Priest | B62K 15/008 | 280/278 |
| 2014/0356050 A1* | 12/2014 | Yu | B62K 19/18 | 403/110 |

* cited by examiner

FOLDABLE RIDING VEHICLE

BACKGROUND OF THE INVENTION

1. Field of the Invention

The present invention relates to a foldable riding vehicle and, particularly, to a foldable riding vehicle with a structure which is simple and which is capable of being folded to a configuration occupying a small space.

2. Description of the Related Art

TW Pat. No. M464387 discloses a two-stage folding structure of a foldable riding vehicle. The structure includes a first end and a second end pivotally connected to the first end. The structure is movable to an extended position in which the first and second ends are located oppositely, and to a folded position in which the first and second ends are located side by side. By folding the structure, the foldable riding vehicle can have a shorter length than extended. Furthermore, the foldable riding vehicle includes a steering handle movable between extended and folded positions.

Since the first and second ends of the structure are located side by side, the foldable riding vehicle becomes too wide to move through a narrow space. In addition, the steering handle, in the folded position, is not located symmetrically with respect to the structure, so it is difficult to tow the foldable riding vehicle from the steering handle stably and easily.

The present invention is, therefore, intended to obviate or at least alleviate the problems encountered in the prior art.

SUMMARY OF THE INVENTION

According to the present invention, a foldable riding vehicle includes a frame having a front end and a rear end pivotally connected to the front end. The front end is connected to a steering mechanism which includes a steering handle and which engages with a front wheel which is rotatable about a first axle. The rear end has a first distal end pivotally connected to the front end and a second distal end engaging with a rear wheel which is rotatable about a second axle. A seat support has a first end pivotally connected to the rear end of the frame and a second end supporting a seat. A pedal mechanism is movable between use and stowed positions and includes two pedal structures, which move towards the rear end of the frame when the pedal mechanism moves from the use position to the stowed position. The foldable riding vehicle is movable between extended and folded positions. When the foldable riding vehicle moves from the extended position to the folded position, the front and rear ends of the frame pivot in a first direction, the front wheel moves towards the rear wheel, the seat support pivots towards the front end of the frame, and the seat support and the seat move towards the front end of the frame. When the foldable riding vehicle moves from the folded position to the extended position, the front and rear ends of the frame pivot in a second direction, the front wheel moves away from the rear wheel, the seat support pivots away from the front end of the frame, and the seat support and the seat move away from the front end of the frame. The foldable riding vehicle, in the extended position, includes the steering handle located symmetrically with respect to the frame and the pedal mechanism moved to the use position, and is configured to allow the front wheel to be located distal to the rear wheel, and the front and rear wheels to rotate on a surface. The foldable riding vehicle, in the folded position, includes the steering handle located symmetrically with respect to the frame and the pedal mechanism moved to the stowed position, and is configured to allow the front wheel to be located adjacent to the rear wheel, the front wheel to be located at a higher height than the rear wheel and not to abut the surface, and the rear wheel to rotate on the surface.

It is also contemplated that the front and rear ends of the frame are pivotal about a first axis. The frame includes the rear end thereof including first and second pivot-connected ends. The seat support includes a third pivot-connected end connected to the first pivot-connected end and being pivotal about a second axis and a fourth pivot-connected end. The pedal mechanism includes a carrier with a fifth pivot-connected end connected to the fourth pivot-connected end and being pivotal about a third axis and with a sixth pivot-connected end. At least one linkage has a seventh pivot-connected end connected to the second pivot-connected end and pivotal about a fourth axis, with an eighth pivot-connected end connected to the sixth pivot-connected end and being pivotal about a fifth axis. A bottom bracket engages with and is rotatable relative to the carrier about a sixth axis and coupling two pedal structures.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an objective of the present invention to provide a foldable riding vehicle moveable to an extended position and a folded position.

It is another objective of the present invention that the foldable riding vehicle, in the folded position, occupies a small space and can be towed stably and easily.

Other objectives, advantages, and new features of the present invention will become apparent from the following detailed description of the invention when considered in conjunction with the accompanied drawings.

DETAILED DESCRIPTION OF THE INVENTION

Figure 1:
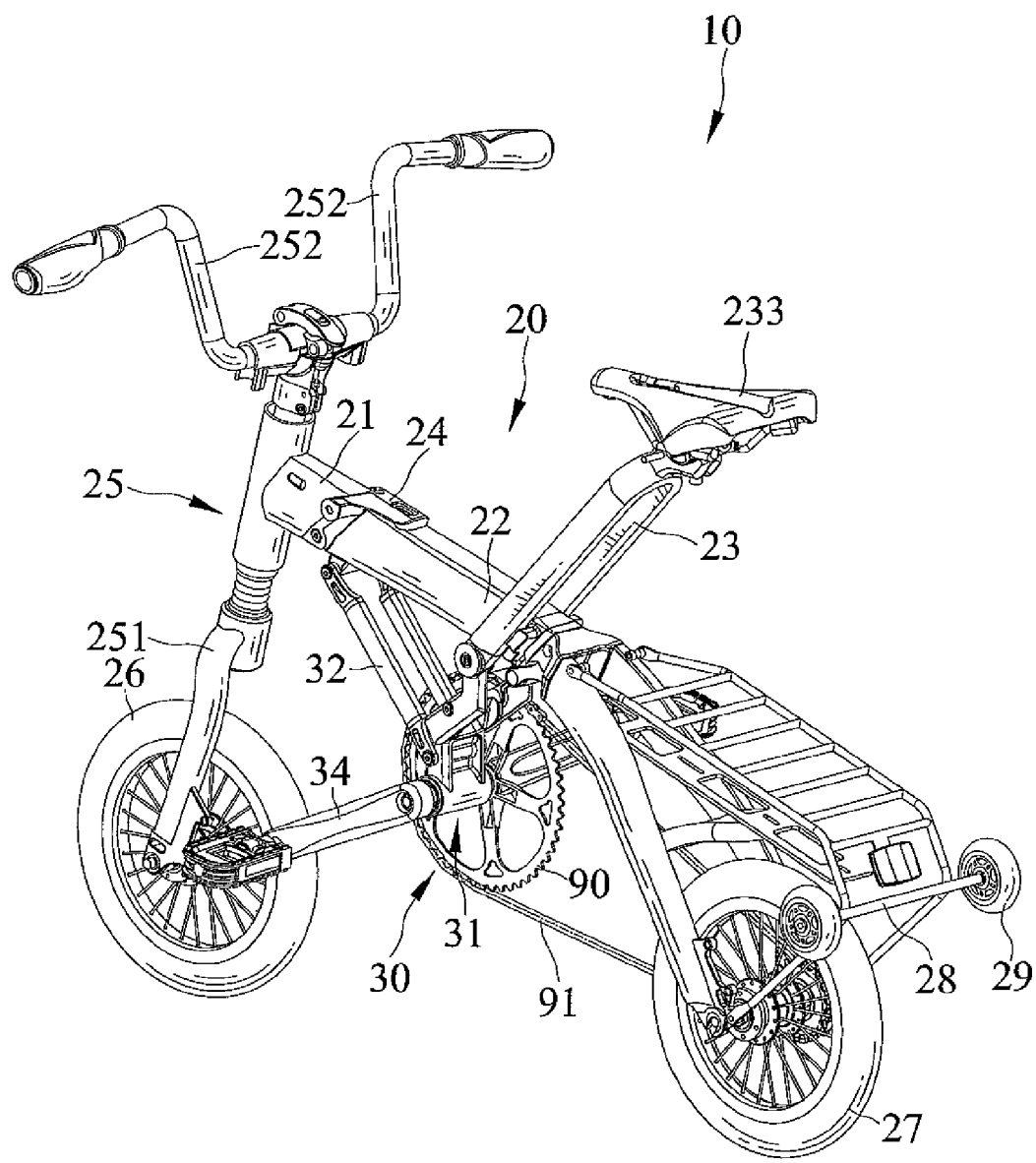
FIG. 1 is a perspective view of a foldable riding vehicle in accordance with the present invention, with the foldable riding vehicle in an extended position.
Figure 2:
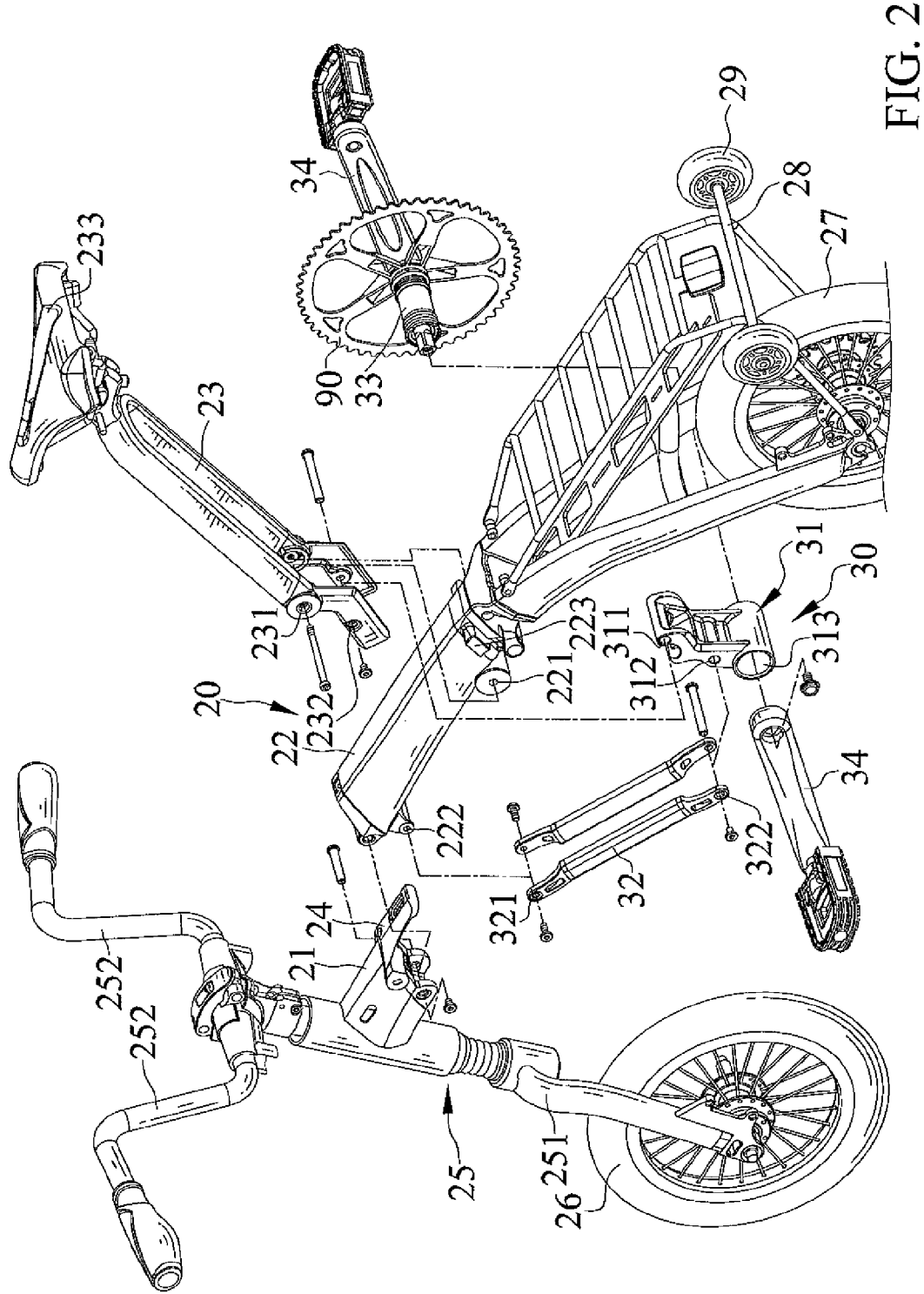
FIG. 2 is an exploded perspective view of the foldable riding vehicle.
Figure 3:
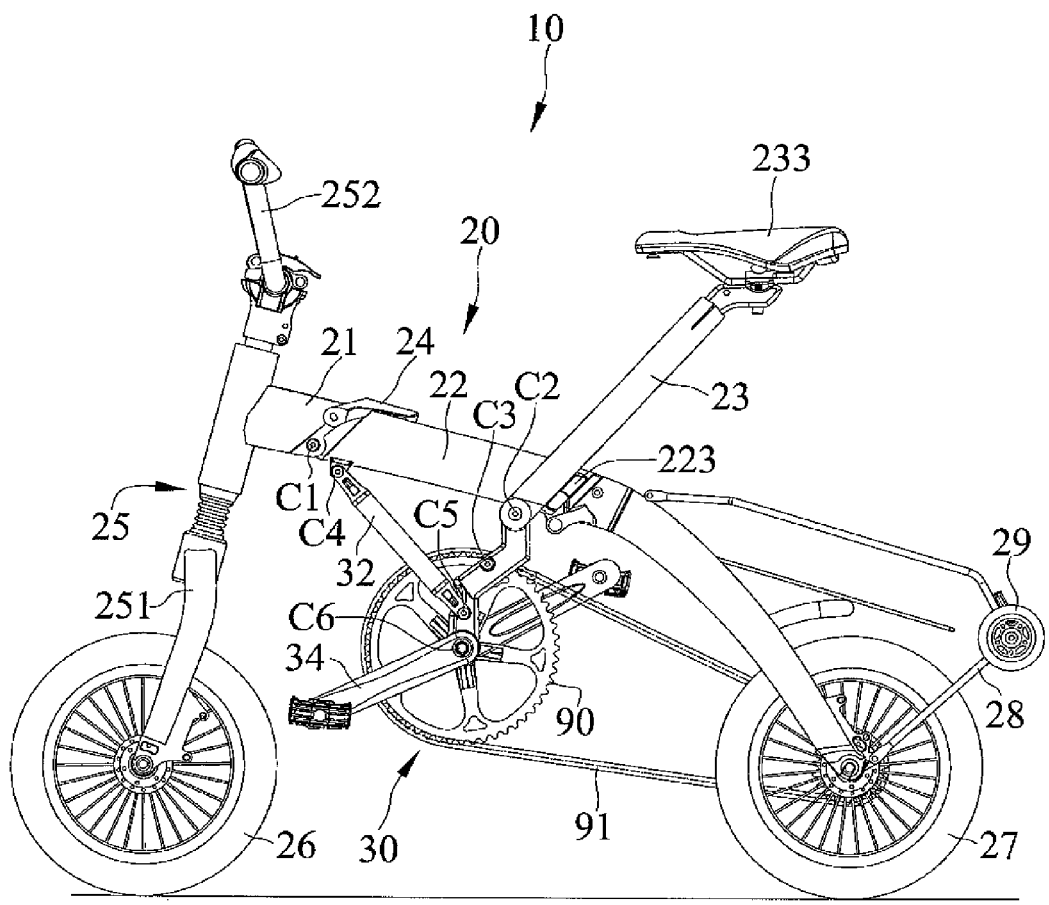
FIG. 3 is a side view of the foldable riding vehicle.
Figure 4:
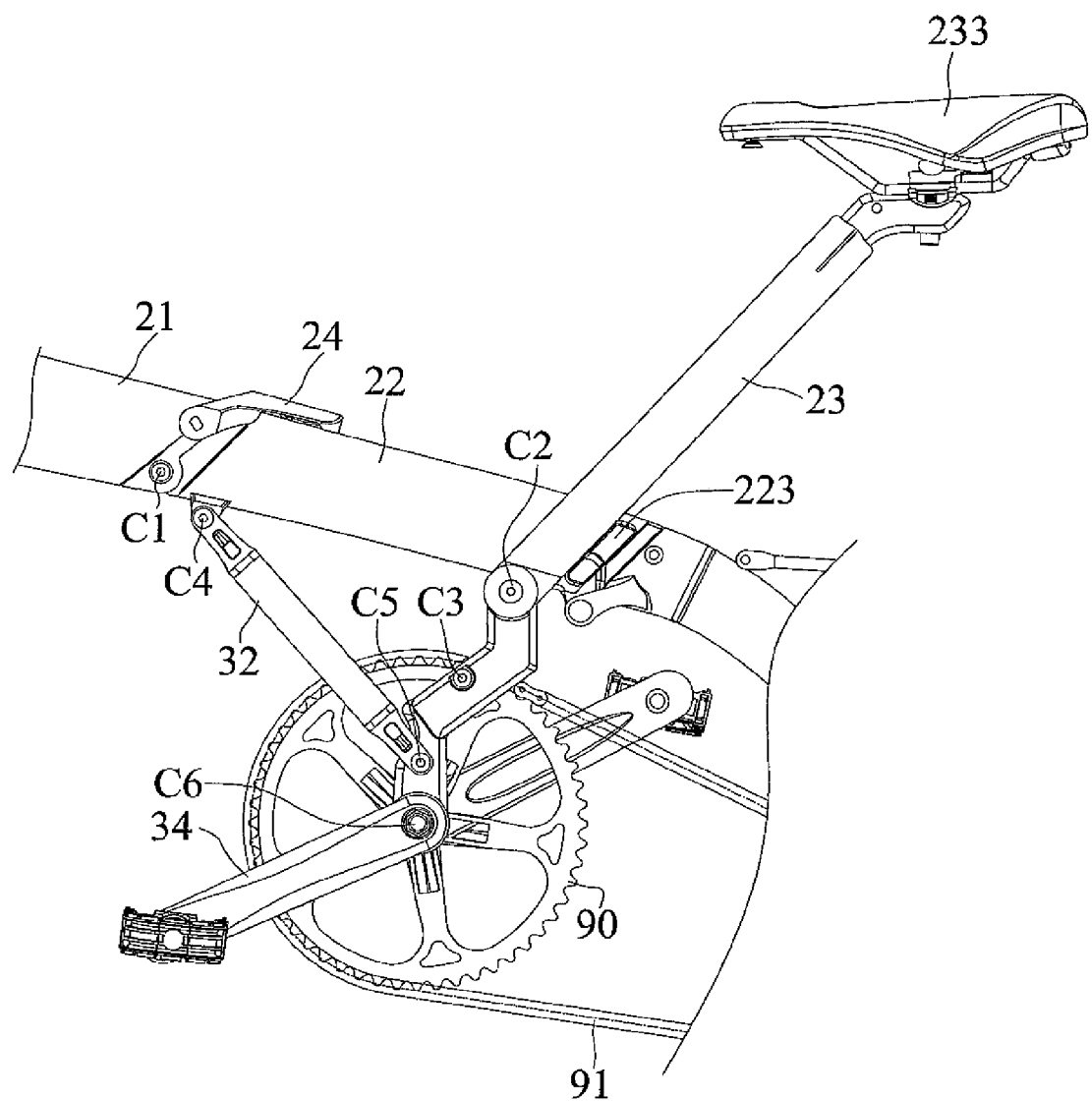
FIG. 4 is a partial enlarged view of FIG. 3.
Figure 5:
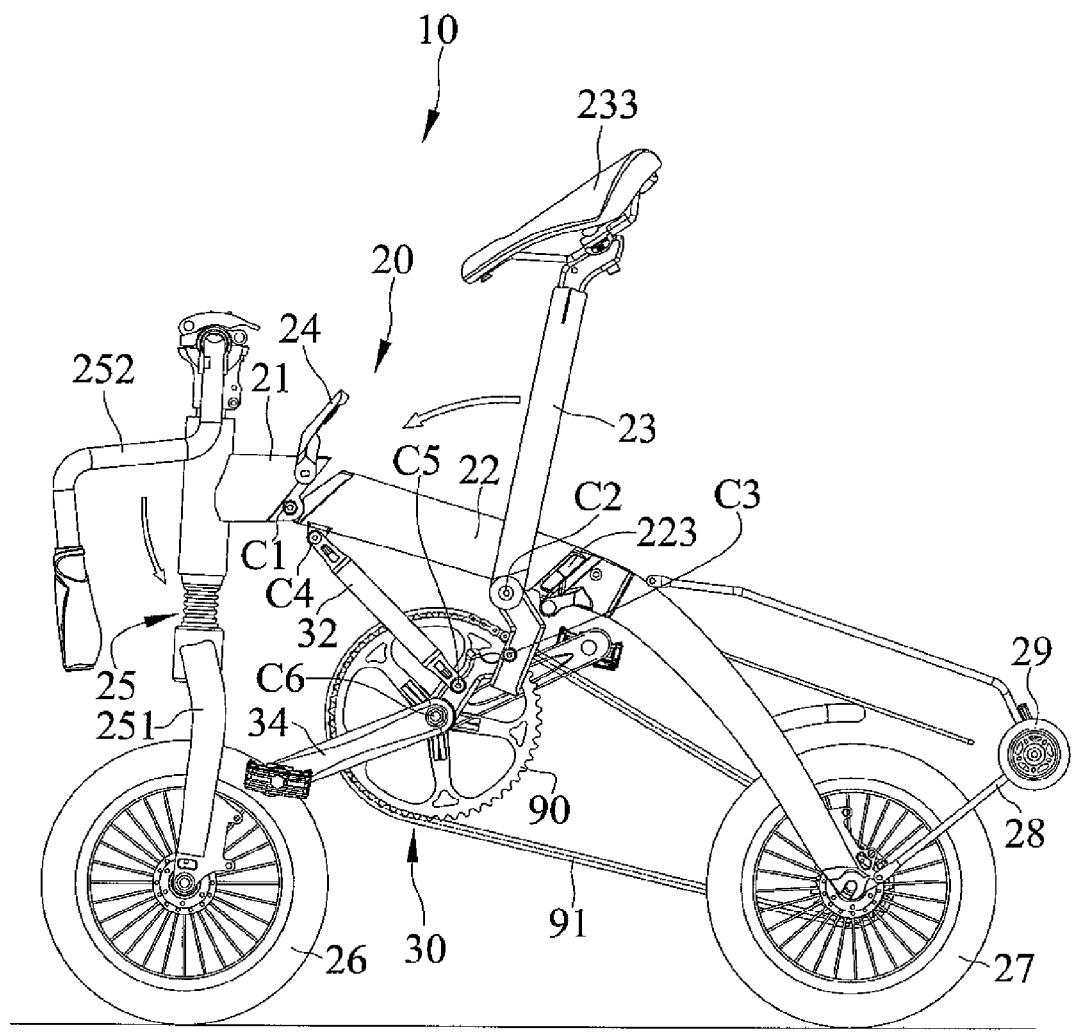
FIG. 5 illustrates the operation of folding the foldable riding vehicle.
Figure 6:
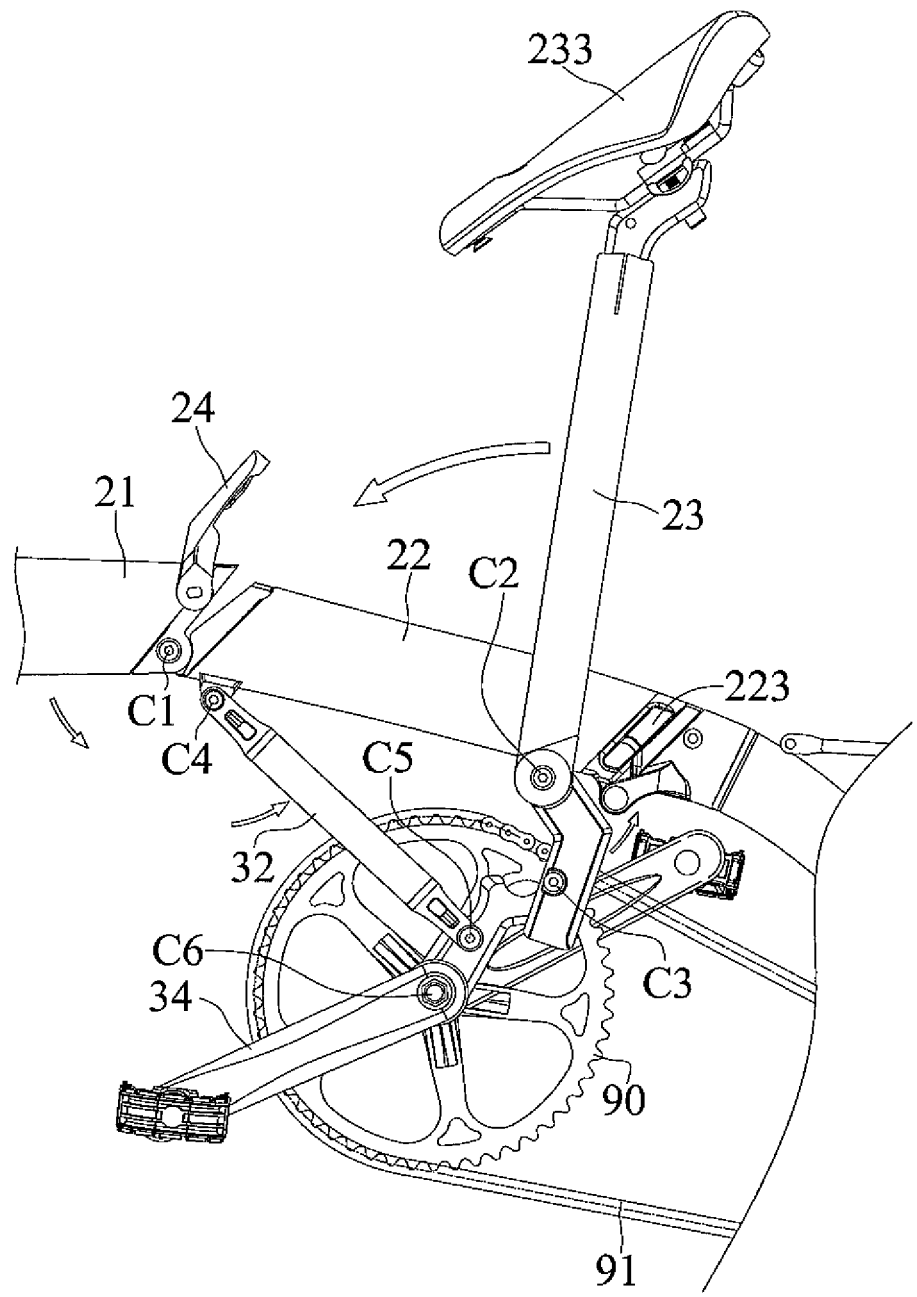
FIG. 6 is a partial enlarged view of FIG. 5.
Figure 7:
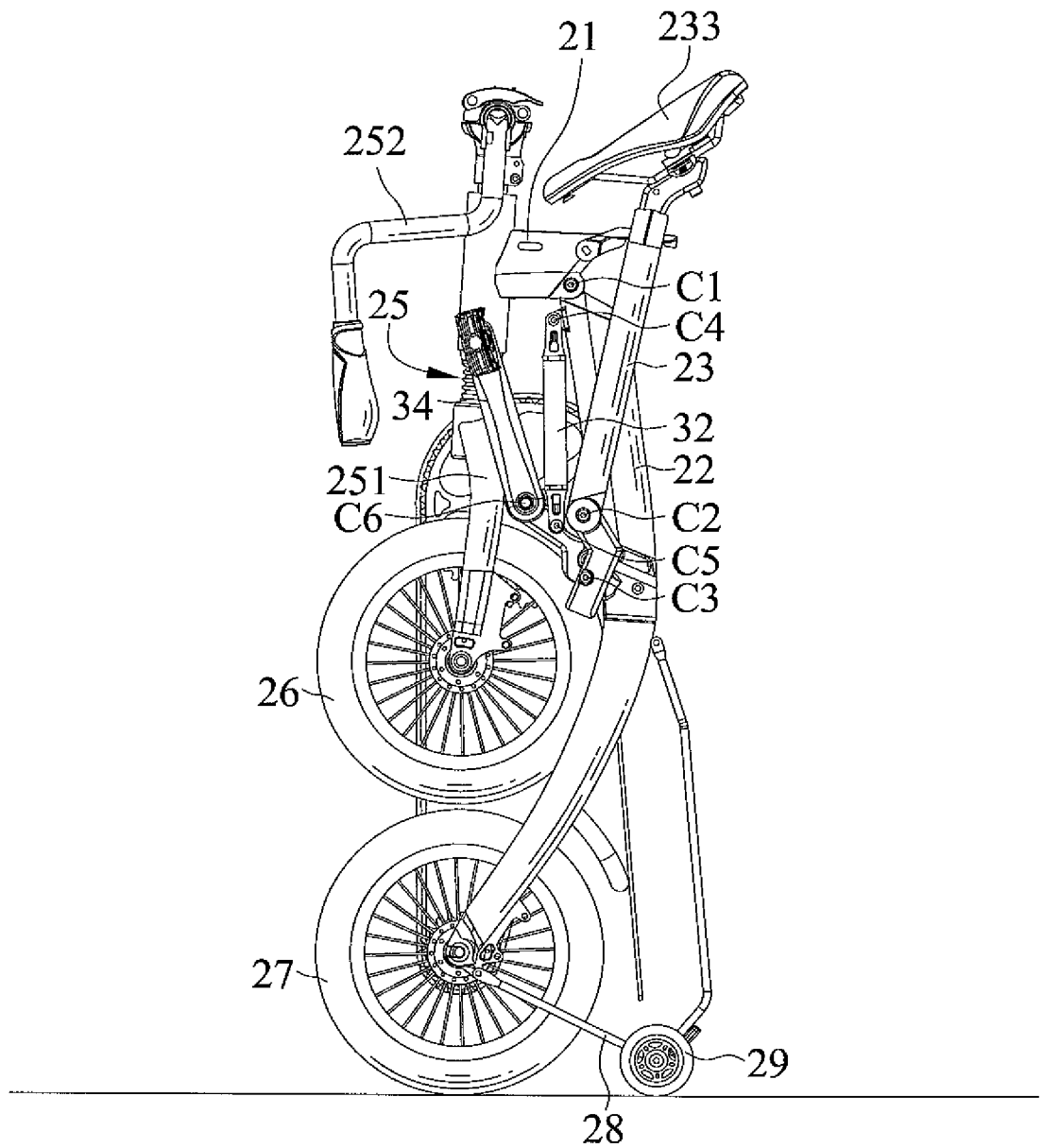
FIG. 7 is a side view showing the foldable riding vehicle in a folded position.

FIGS. 1 through 7 show a foldable riding vehicle 10 in accordance with the present invention. The foldable riding vehicle 10 includes a frame 20 and a pedal mechanism 30.

The frame 20 has a front end 21 and a rear end 22 pivotally connected to the front end 21 and being pivotal about a first axis C1. The frame 20 includes the rear end 22 thereof including first and second pivot-connected ends 221 and 222. A seat support 23 has a first end pivotally connected to the rear end 22 of the frame 20 and a second end supporting a seat 233. The seat support 23 includes a third pivot-connected end 231 connected to the first pivot-connected end 221 and being pivotal about a second axis C2 and a fourth pivot-connected end 232. A stopper restrains the seat support 23. The stopper 223 extends from the rear end 22 of the frame 20 and releasably engages with the seat support 23. The seat support 23 has two bifurcations, and the rear end 22 of the frame 20 is located between the two bifurcations. The two stoppers 223 extend from two opposite lateral sides of the rear end 22 of the frame 20 and releasably engage with the two bifurcations, respectively. A latch 24 prevents the front and rear ends 21 and 22 of the frame 20 from pivoting relative to each other. The latch 24 has a first end fixed to one of the front and rear ends 21 and 22 of the frame 20 and a second end releasably securing to the other of front and rear ends 21 and 22. The frame 20 includes the front end 21 thereof connected to a steering mechanism 25 which includes a steering handle and which engages with a front wheel 26 which is rotatable about a first axle. The steering handle has two gripping ends 252 allowing a rider to control the steering mechanism 25. The steering mechanism 25 includes at least one prong 251. The front wheel 26 is rotatably fixed to the at least one prong 251. The frame 20 includes the rear end 22 thereof having a first distal end pivotally connected to the front end 21 and a second distal end engaging with a rear wheel 27 which is rotatable about a second axle.

The pedal mechanism 30 is movable between use and stowed positions. The pedal mechanism 30 includes a carrier 31 with a fifth pivot-connected end 311 connected to the fourth pivot-connected end 232 and being pivotal about a third axis C3 and with a sixth pivot-connected end 312. The carrier 31 defines a bottom bracket shell 313 receiving the bottom bracket 33. The sixth pivot-connected joint 312 of the carrier 31 is located between the fifth pivot-connected joint 311 and the bottom bracket shell 313 of the carrier 31. The pedal mechanism 30 includes at least one linkage 32 with a seventh pivot-connected end 321 connected to the second pivot-connected end 222 and being pivotal about a fourth axis C4 and with an eighth pivot-connected end 322 connected to the sixth pivot-connected end 312 and being pivotal about a fifth axis C5. The seventh and eighth pivot-connected ends 321 and 322 are defined at two opposite ends of the at least one linkage 32. In the embodiment, the at least one linkage 32 includes two linkages 32. The pedal mechanism 30 includes the bottom bracket 33 engaging with and being rotatable relative to the carrier 31 about a sixth axis C6 and coupling two pedal structures 34. The two pedal structures 34 move towards the rear end 22 of the frame 20 when the pedal mechanism 30 moves from the use position to the stowed position.

The first, second, third, fourth, fifth, and sixth axes C1, C2, C3, C4, C5, and C6 are parallel to each other.

A chain wheel 90 engages with the pedal mechanism 30. The chain wheel 90 engages and rotates with the bottom bracket 33. A chain 91 couples the chain wheel 90 and the second axle of the rear wheel 27. The chain 91 transfers power from the two pedal structures 34 to the rear wheel 27.

The foldable riding vehicle 10 is movable between extended and folded positions. When the foldable riding vehicle 10 moves from the extended position to the folded position, the front and rear ends 21 and 22 of the frame 20 pivot in a first direction, the front wheel 26 moves towards the rear wheel 27, the seat support 23 pivots towards the front end 21 of the frame 20, the seat support 23 and the seat 233 move towards the front end 21 of the frame 20, the fifth axis C5 moves towards the second axis C2, and the third axis C3 moves away from the front end 21 of the frame 20. When the foldable riding vehicle 10 moves from the folded position to the extended position, the front and rear ends 21 and 22 of the frame 20 pivot in a second direction, the front wheel 26 moves away from the rear wheel 27, the seat support 23 pivots away from the front end 21 of the frame 20, the seat support 23 and the seat 233 move away from the front end 21 of the frame 20, the fifth phantom axis C5 moves away from the second axis C2, and the third axis C3 moves towards the front end 21 of the frame 20.

The foldable riding vehicle 10, in the extended position, includes the seat support 23 engaging with the stopper 223, the latch 24 latching the front and rear ends 21 and 22 of the frame 20, the steering handle located symmetrically with respect to the frame 20, the pedal mechanism 30 moved to the use position, the two linkages 32 located symmetrically with respect to the frame 20, and configured to allow the front wheel 26 to be located distal to the rear wheel 27, and the front and rear wheels 26 and 27 to rotate on a surface. The foldable riding vehicle 10, in the folded position, includes the seat support 23 disengaging with the stopper 223, the latch 24 unlatching the front and rear ends 21 and 22 of the frame 20, the steering handle located symmetrically with respect to the frame 20, the pedal mechanism 30 moved to the stowed position, the two linkages 32 located symmetrically with respect to the frame 20, and configured to allow the front wheel 26 to be located adjacent to the rear wheel 27, the front wheel 26 to be located at a higher height than the rear wheel 27 and not to abut the surface, and the rear wheel 27 to rotate on the surface.

The foldable riding vehicle 10, in the extended position, includes the second, fourth and fifth axes C2, C4, and C5 not aligned and forming the shape of a triangle and the third axis C3 located between the second and fifth axes C2 and C5. The foldable riding vehicle 10, in the folded position, includes the third axis C3 outside a triangular area defined by the second, fourth and fifth axes C2, C4, and C5.

Furthermore, a support stand 28 is cooperative with the rear wheel 27 to allow the foldable riding vehicle 10 to stand in an upright position on the surface. The support stand 28 is secured to the foldable riding vehicle 10. The foldable riding vehicle 10 standing in the upright position on the surface is moved to the folded position and includes only the support stand 28 and the rear wheel 27 abutting the surface. The foldable riding vehicle 10, in the extended position, is configured to allow the support stand 28 to not be located at a lower height than the second axle of the rear wheel 27 and to interfere with the surface. The support stand 28 includes a structure with two first bars located symmetrically with respect to the rear wheel 27 and a second bar interconnecting and extending between the two first bars. Each of the two first bars has a first end secured to the foldable riding vehicle 10 and a second end defining a free end. The support stand 28 includes two wheels rotatably engaging with two ends of the second bar, respectively.

In view of the forgoing, the foldable riding vehicle 10 is movable between extended and folded positions. When the foldable riding vehicle 10 moves from the extended position to the folded position, the front wheel 26 moves towards the rear wheel 27, the seat support 23 and the seat 233 move towards the front end 21 of the frame 20, the fifth axis C5 moves towards the second axis C2, and the third axis C3 moves away from the front end 21 of the frame 20. When the foldable riding vehicle 10 moves from the folded position to the extended position, the front wheel 26 moves away from the rear wheel 27, the seat support 23 and the seat 233 move away from the front end 21 of the frame 20, the fifth axis C5 moves away from the second axis C2, and the third axis C3 moves towards the front end 21 of the frame 20. Moreover, the two pedal structures 34 move towards the rear end 22 of the frame 20 when the pedal mechanism 30 moves from the use position to the stowed position. Moreover, the foldable riding vehicle 10, in the extended position, includes the steering handle located symmetrically with respect to the frame 20, the pedal mechanism 30 moved to the use position, and configured to allow the front wheel 26 to be located distal to the rear wheel 27, and the front and rear wheels 26 and 27 to rotate on the surface. The foldable riding vehicle 10, in the folded position, includes the steering handle located symmetrically with respect to the frame 20, the pedal mechanism 30 moved to the stowed position, and configured to allow the front wheel 26 to be located adjacent to the rear wheel 27, the front wheel 26 to be located at a higher height than the rear wheel 27 and not to abut the surface, and the rear wheel 27 to rotate on the surface. Moreover, the foldable riding vehicle 10 standing in the upright position on the surface is moved to the folded position and includes only the two wheels 29 of the support stand 28 and the rear wheel 27 abutting the surface. Therefore, the foldable riding bicycle 10 is in a three-point contact on the surface and stands stably. In addition, the rear wheel 27 and the two wheels 29 allow the foldable riding bicycle standing in the upright position to move easily and in a stable manner.

The foregoing is merely illustrative of the principles of this invention, and various modifications can be made by those skilled in the art without departing from the scope and spirit of the invention.

What is claimed is:

1. A foldable riding vehicle comprising:
   a frame having a front end and a rear end pivotally connected to the front end and being pivotal about a first axis, with the rear end including first and second pivot-connected ends, with the front end connected to a steering mechanism which includes a steering handle and which engages with a front wheel which is rotatable about a first axle, with the rear end having a first distal end pivotally connected to the front end and a second distal end engaging with a rear wheel which is rotatable about a second axle;
   a seat support pivotally connected to the rear end of the frame and supporting a seat, with the seat support including a third pivot-connected end connected to the first pivot-connected end and pivotal about a second axis and a fourth pivot-connected end; and
   a pedal mechanism movable between use and stowed positions, with the pedal mechanism including a carrier with a fifth pivot-connected end connected to the fourth pivot-connected end and pivotal about a third axis and with a sixth pivot-connected end, with the pedal mechanism including at least one linkage with a seventh pivot-connected end connected to the second pivot-connected end and pivotal about a fourth phantom axis and with an eighth pivot-connected end connected to the sixth pivot-connected end and pivotal about a fifth axis, and with the pedal mechanism including a bottom bracket engaging with and rotatable relative to the carrier about a sixth axis and coupling two pedal structures;
   wherein the first, second, third, fourth, fifth, and sixth axes are parallel to each other; and
   wherein the frame is movable between extended and folded positions; and
   wherein when the frame moves from the extended position to the folded position, the front and rear ends of the frame pivot in a first direction, the front wheel moves towards the rear wheel, the seat support pivots towards the front end of the frame, the seat support and the seat move towards the front end of the frame, the fifth axis moves towards the second axis, and the third axis moves away from the front end of the frame; and
   wherein when the frame moves from the folded position to the extended position, the front and rear ends of the frame pivot in a second direction, the front wheel moves away from the rear wheel, the seat support pivots away from the front end of the frame, the seat support and the seat move away from the front end of the frame, the fifth axis moves away from the second axis, and the third axis moves towards the front end of the frame; and
   wherein in the extended position, the steering handle is located symmetrically with respect to the frame, the pedal mechanism moves to the use position, the front wheel to be located distal to the rear wheel, and the front and rear wheels rotate on a surface; and
   wherein in the folded position, the steering handle is located symmetrically with respect to the frame, the pedal mechanism moves to the stowed position, the front wheel is located adjacent to the rear wheel, the front wheel is located at a higher height than the rear wheel and not to abut the surface, and the rear wheel rotates on the surface.

2. The foldable riding vehicle as claimed in claim 1, wherein in the extended position, the second, fourth and fifth axes are not aligned and form the shape of a triangle and the third axis is located between the second and fifth axes, and wherein in the folded position, the third axis is outside a triangular area defined by the second, fourth and fifth phantom axes.

3. The foldable riding vehicle as claimed in claim 1, wherein the carrier defines a bottom bracket shell receiving the bottom bracket, and wherein the sixth pivot-connected joint of the carrier is located between the fifth pivot-connected joint and the bottom bracket shell of the carrier.

4. The foldable riding vehicle as claimed in claim 2, wherein the carrier defines a bottom bracket shell receiving the bottom bracket, and wherein the sixth pivot-connected joint of the carrier is located between the fifth pivot-connected joint and the bottom bracket shell of the carrier.

5. The foldable riding vehicle as claimed in claim 1, wherein the at least one linkage includes first and second linkages, and wherein in the extended and folded positions, the first and second linkages are located symmetrically with respect to the frame.

6. The foldable riding vehicle as claimed in claim 2, wherein the at least one linkage includes first and second linkages, and wherein in the extended and folded positions, the first and second linkages are located symmetrically with respect to the frame.

7. The foldable riding vehicle as claimed in claim 3, wherein the at least one linkage includes first and second linkages, and wherein in the extended and folded positions, the first and second linkages are located symmetrically with respect to the frame.

8. The foldable riding vehicle as claimed in claim 1 further comprising a latch configured to prevent the front and rear ends of the frame from pivoting relative to each other, wherein the latch has a first end fixed to one of the front and rear ends of the frame and a second end releasably securing to another of front and rear ends of the frame, and wherein in the extended position, the latch secures the other of the front and rear ends of the frame.

9. The foldable riding vehicle as claimed in claim 1 further comprising a stopper configured to restrain the seat support, wherein the stopper extends from the rear end of the frame and releasably engages with the seat support, and wherein in the extended position, the seat support engages with the stopper.

10. The foldable riding vehicle as claimed in claim 1 further comprising a chain wheel engaging and rotating with the bottom bracket, and a chain coupling the chain wheel and the second axle of the rear wheel, and wherein the chain is configured to transfer power from the two pedal structures to the rear wheel.

11. The foldable riding vehicle as claimed in claim 1, further comprising a support stand secured cooperative with the rear wheel to allow the frame to stand in an upright position on the surface, wherein the frame standing in the upright position on the surface is moved to the folded position wherein only the support stand and the rear wheel abut the surface, and wherein in the extended position, the support stand is not located at a lower height than the second axle of the rear wheel to interfere with the surface.

12. The foldable ridging vehicle as claimed in claim 11, wherein the support stand includes a structure with two first bars located symmetrically with respect to the rear wheel and a second bar interconnecting and extending between the two first bars, wherein each of the two first bars has a first end secured to the frame and a second end defining a free end, and wherein the support stand includes two wheels rotatably engaging with two ends of the second bar, respectively.

13. A foldable riding vehicle comprising:
a frame having a front end and a rear end pivotally connected to the front end, with the front end connected to a steering mechanism which includes a steering handle and which engages with a front wheel which is rotatable about a first axle, with the rear end having a first distal end pivotally connected to the front end and a second distal end engaging with a rear wheel which is rotatable about a second axle;
a seat support having a first end pivotally connected to the rear end of the frame and a second end supporting a seat;
a pedal mechanism movable between use and stowed positions and including two pedal structures which move towards the rear end of the frame when the pedal mechanism moves from the use position to the stowed position; and
a stopper configured to restrain the seat support, wherein the stopper extends from the rear end of the frame and releasably engages with the seat support, wherein the frame is movable between extended and folded positions;
wherein when moving from the extended position to the folded position, the front and rear ends of the frame pivot in a first direction, the front wheel moves towards the rear wheel, the seat support pivots towards the front end of the frame, and the seat support and the seat move towards the front end of the frame;
wherein when moving from the folded position to the extended position, the front and rear ends of the frame pivot in a second direction, the front wheel moves away from the rear wheel, the seat support pivots away from the front end of the frame, and the seat support and the seat move away from the front end of the frame;
wherein in the extended position, the pedal mechanism moves to the use position, the front wheel is located distal to the rear wheel, and the front and rear wheels rotate on a surface;
wherein in the folded position, the pedal mechanism moves to the stowed position, the front wheel is located adjacent to the rear wheel, the front wheel is located at a higher height than the rear wheel and does not abut the surface, and the rear wheel rotates on the surface; and
wherein in the extended position, the seat support engages with the stopper.

14. The foldable riding vehicle as claimed in claim 13 further comprising a latch configured to prevent the front and rear ends of the frame from pivoting relative to each other, wherein the latch has a first end fixed to one of the front and rear ends of the frame and a second end releasably securing to another of front and rear ends of the frame, and wherein in the extended position, the latch secures the other of the front and rear ends of the frame.

15. A foldable riding vehicle comprising:
a frame having a front end and a rear end pivotally connected to the front end, with the front end connected to a steering mechanism which includes a steering handle and which engages with a front wheel which is rotatable about a first axle, with the rear end having a first distal end pivotally connected to the front end and a second distal end engaging with a rear wheel which is rotatable about a second axle;
a seat support having a first end pivotally connected to the rear end of the frame and a second end supporting a seat;
a pedal mechanism movable between use and stowed positions and including two pedal structures which move towards the rear end of the frame when the pedal mechanism moves from the use position to the stowed position; and
a support stand secured cooperative with the rear wheel to allow the frame to stand in an upright position on the surface, wherein the frame is movable between extended and folded positions;
wherein when moving from the extended position to the folded position, the front and rear ends of the frame pivot in a first direction, the front wheel moves towards the rear wheel, the seat support pivots towards the front end of the frame, and the seat support and the seat move towards the front end of the frame;

wherein when moving from the folded position to the extended position, the front and rear ends of the frame pivot in a second direction, the front wheel moves away from the rear wheel, the seat support pivots away from the front end of the frame, and the seat support and the seat move away from the front end of the frame;

wherein in the extended position, the steering handle is located symmetrically with respect to the frame, the pedal mechanism moves to the use position, the front wheel is located distal to the rear wheel, and the front and rear wheels rotate on a surface;

wherein in the folded position, the steering handle is located symmetrically with respect to the frame, the pedal mechanism moves to the stowed position, the front wheel is located adjacent to the rear wheel, the front wheel is located at a higher height than the rear wheel and not to abut the surface, and the rear wheel rotates on the surface;

wherein the frame standing in the upright position on the surface is moved to the folded position wherein only the support stand and the rear wheel abut the surface, and wherein in the extended position, the support stand is not located at a lower height than the second axle of the rear wheel to interfere with the surface.

16. The foldable ridging vehicle as claimed in claim 15, wherein the support stand includes a structure with two first bars located symmetrically with respect to the rear wheel and a second bar interconnecting and extending between the two first bars, wherein each of the two first bars has a first end secured to the frame and a second end defining a free end, and wherein the support stand includes two wheels rotatably engaging with two ends of the second bar, respectively.

* * * * *